(12) United States Patent
Tan et al.

(10) Patent No.: US 8,777,934 B1
(45) Date of Patent: Jul. 15, 2014

(54) BALANCER SWIVEL ARM ASSEMBLY

(71) Applicant: Western Digital Technologies, Inc., Irvine, CA (US)

(72) Inventors: Jit Han Tan, Petaling Jaya (MY); Sie Cheang Phuah, Subang Jaya (MY)

(73) Assignee: Western Digital Technologies, Inc., Irvine, CA (US)

(*) Notice: Subject to any disclaimer, the term of this patent is extended or adjusted under 35 U.S.C. 154(b) by 0 days.

(21) Appl. No.: 13/790,317

(22) Filed: Mar. 8, 2013

Related U.S. Application Data

(62) Division of application No. 12/645,410, filed on Dec. 22, 2009, now Pat. No. 8,424,824.

(51) Int. Cl.
*A61B 17/00* (2006.01)

(52) U.S. Cl.
USPC .... 606/1; 248/276.1; 248/176.3; 248/297.11; 248/123.11; 81/57.4

(58) Field of Classification Search
USPC ......... 248/276.1, 282.1, 157, 280.11, 292.11, 248/297.11, 176.3, 123.11; 81/57.4, 57.24; 294/213; 414/941; 606/1; 600/102
See application file for complete search history.

(56) References Cited

U.S. PATENT DOCUMENTS

| | | | |
|---|---|---|---|
| 3,279,045 A * | 10/1966 | Dixon | 29/809 |
| 3,333,613 A * | 8/1967 | Bosse | 81/57.4 |
| 3,694,888 A | 10/1972 | Bosse | |
| 3,910,325 A * | 10/1975 | Dixon | 81/57.37 |
| 4,782,726 A * | 11/1988 | Ryder et al. | 81/57.4 |
| 4,863,133 A | 9/1989 | Bonnell | |
| 4,924,732 A * | 5/1990 | Hoskins et al. | 81/54 |
| 5,109,736 A | 5/1992 | Dixon | |
| 5,213,292 A | 5/1993 | Evans | |
| 5,213,293 A * | 5/1993 | Muentener et al. | 248/123.11 |
| 5,367,924 A | 11/1994 | Henson et al. | |
| 5,544,554 A | 8/1996 | Brightly | |
| 5,580,021 A | 12/1996 | Gillanders | |
| 5,597,146 A * | 1/1997 | Putman | 248/276.1 |
| 5,609,316 A | 3/1997 | Tigliev | |
| 5,825,536 A * | 10/1998 | Yasunaga et al. | 359/384 |
| 6,050,530 A * | 4/2000 | Nakamura | 248/123.2 |
| 6,065,373 A | 5/2000 | Watanabe et al. | |
| 6,276,489 B1 | 8/2001 | Busuttil et al. | |
| 6,514,239 B2 * | 2/2003 | Shimmura et al. | 606/1 |
| 6,702,238 B1 | 3/2004 | Wang | |
| 6,711,972 B1 | 3/2004 | Joyner et al. | |
| 6,736,033 B2 | 5/2004 | Castanon | |
| 6,933,695 B2 * | 8/2005 | Blumenkranz | 318/568.11 |

(Continued)

OTHER PUBLICATIONS

Office Action dated Sep. 9, 2011 from U.S. Appl. No. 12/645,410, 19 pages.

(Continued)

*Primary Examiner* — Terrell McKinnon
*Assistant Examiner* — Daniel J Breslin

(57) ABSTRACT

A balancer swivel arm assembly includes an articulated arm configured to be pivotably attached to a work station at a proximal end. A linear slider is slidably mounted on a distal end of the articulated arm. A spring balancer is mounted on the distal end of the articulated arm and is coupled to the linear slider. The spring balancer is configured to support the linear slider and a tool mounted to the linear slider through a linear range of motion along an axis.

8 Claims, 4 Drawing Sheets

(56) References Cited

U.S. PATENT DOCUMENTS

| | | |
|---|---|---|
| 7,036,787 B1 | 5/2006 | Lin |
| 7,055,789 B2 * | 6/2006 | Libbey et al. ............ 248/278.1 |
| 7,189,246 B2 * | 3/2007 | Otsuka et al. ............ 606/130 |
| 7,191,695 B2 * | 3/2007 | Sato et al. ............ 92/13.7 |
| 7,243,892 B2 | 7/2007 | Pfister |
| 7,303,527 B2 * | 12/2007 | Ng ............ 600/102 |
| D558,561 S * | 1/2008 | Ciungan ............ D8/363 |
| 7,325,777 B2 | 2/2008 | Thiessen |
| 7,347,862 B2 * | 3/2008 | Layer ............ 606/130 |
| D569,381 S | 5/2008 | Sculler et al. |
| 7,374,123 B2 * | 5/2008 | Han ............ 242/385.2 |
| 7,420,731 B2 * | 9/2008 | Piontkowski ............ 359/382 |
| 7,556,626 B2 | 7/2009 | Ueda et al. |
| 7,559,590 B1 * | 7/2009 | Jones ............ 294/2 |
| 7,621,490 B2 | 11/2009 | Tseng |
| 7,670,281 B2 * | 3/2010 | Kronner ............ 600/102 |
| 7,708,243 B2 | 5/2010 | Wang et al. |
| 7,780,125 B2 * | 8/2010 | Yen et al. ............ 248/125.1 |
| 7,837,674 B2 * | 11/2010 | Cooper ............ 606/1 |
| 7,854,417 B2 * | 12/2010 | Gan et al. ............ 248/161 |
| 7,980,159 B1 * | 7/2011 | Han ............ 81/430 |
| 8,127,643 B1 | 3/2012 | Tan |
| 8,182,009 B2 * | 5/2012 | Jamieson et al. ............ 294/183 |
| 8,424,824 B1 | 4/2013 | Tan et al. |
| 8,460,175 B2 * | 6/2013 | Jo et al. ............ 600/102 |
| 2001/0027313 A1 * | 10/2001 | Shimmura et al. ............ 606/1 |
| 2003/0234332 A1 | 12/2003 | Yen et al. |
| 2006/0219849 A1 | 10/2006 | Chiu |
| 2006/0237618 A1 * | 10/2006 | Chiang ............ 248/404 |
| 2010/0102188 A1 | 4/2010 | Liu |

OTHER PUBLICATIONS

Office Action dated Dec. 30, 2011 from U.S. Appl. No. 12/645,410, 15 pages.
Office Action dated Jul. 25, 2012 from U.S. Appl. No. 12/645,410, 9 pages.
Notice of Allowance dated Dec. 7, 2012 from U.S. Appl. No. 12/645,410, 5 pages.

* cited by examiner

BALANCER SWIVEL ARM ASSEMBLY

CROSS REFERENCE TO RELATED APPLICATION

This application is a divisional of U.S. patent application Ser. No. 12/645,410, filed on Dec. 22, 2009, which is hereby incorporated by reference in its entirety.

FIELD

The present disclosure generally concerns tooling used in manufacturing assembly lines and, more particularly, a balancer swivel arm assembly suitable for supporting a power tool in a manufacturing cleanroom environment.

BACKGROUND

Manufacturing assembly lines often require tasks to be repeated hundreds or even thousands of times in a given day. These tasks may involve an operator positioning and operating a relatively heavy power tool by hand. For example, on a hard drive manufacturing assembly line an operator may be required to drive as many as 7,000 screws using a power screwdriver during a single shift. Operator fatigue may result in the screwdriver being improperly positioned during operation thereby causing damage to the screws and/or the hard drive components being fastened.

Conventional solutions for helping an operator to support a power tool on a manufacturing assembly line have several deficiencies particularly relevant to hard drive manufacturing assembly lines. For example, many solutions still require significant effort on the part of an operator to maintain the power tool in a proper position and orientation during operation. In addition, many solutions require support structures too large for use in relatively confined work stations. Finally, many solutions are not suitable for use in the cleanroom environments of hard drive manufacturing assembly lines.

SUMMARY

The subject technology utilizes a novel balancer swivel arm assembly to support a power tool, such as a screwdriver, during tasks performed by an operator. The balancer swivel arm assembly allows the operator to position the power tool through a wide range of pivotal and axial motions while maintaining the power tool in a desired orientation relative to a work piece. The balancer swivel arm assembly may be operated within a relatively confined work station and assembled using components suitable for cleanroom environments.

According to one aspect of the present disclosure, a balancer swivel arm assembly is described. The balancer swivel arm assembly includes an articulated arm configured to be pivotably attached to a work station at a proximal end. A linear slider is slidably mounted on a distal end of the articulated arm. A spring balancer is mounted on the distal end of the articulated arm and is coupled to the linear slider. The spring balancer is configured to support the linear slider and a tool mounted to the linear slider through a linear range of motion along an axis.

According to another aspect of the present disclosure, a balancer swivel arm assembly is described. The balancer swivel arm assembly includes a proximal bracket configured to be attached to a work station. A first intermediate link is pivotably coupled to the bracket with a first rotary shaft and a first plurality of radial bearings. A second intermediate link is pivotably coupled to the first intermediate link with a second rotary shaft and a second plurality of radial bearings. A distal link is pivotably coupled to the second intermediate link with a third rotary shaft and a third plurality of radial bearings. A distal bracket is pivotably coupled to the distal link with a fourth rotary shaft and a fourth plurality of radial bearings. A linear slider is slidably mounted to the distal bracket with a tool attached to the linear slider. A spring balancer is mounted to the distal bracket and coupled to the linear slider and is configured to support the linear slider and the tool through a linear range of motion along a first axis. The first, second, third and fourth rotary shafts are aligned in parallel with the first axis, and the first axis is perpendicular to a work surface of the work station when the proximal bracket is attached to the work station.

According to another aspect of the present disclosure, a method for supporting a tool in a work station is described. The method includes attaching a proximal end of an articulated arm to a work station and mounting a tool to a linear slider attached to a distal end of the articulated arm. The tool and the linear slider are supported through a linear range of motion along a first axis by a balancer attached to the distal end of the articulated arm and coupled to the linear slider.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components have been simplified or omitted from the figures to avoid obscuring the concepts of the subject technology.

Figure 1:
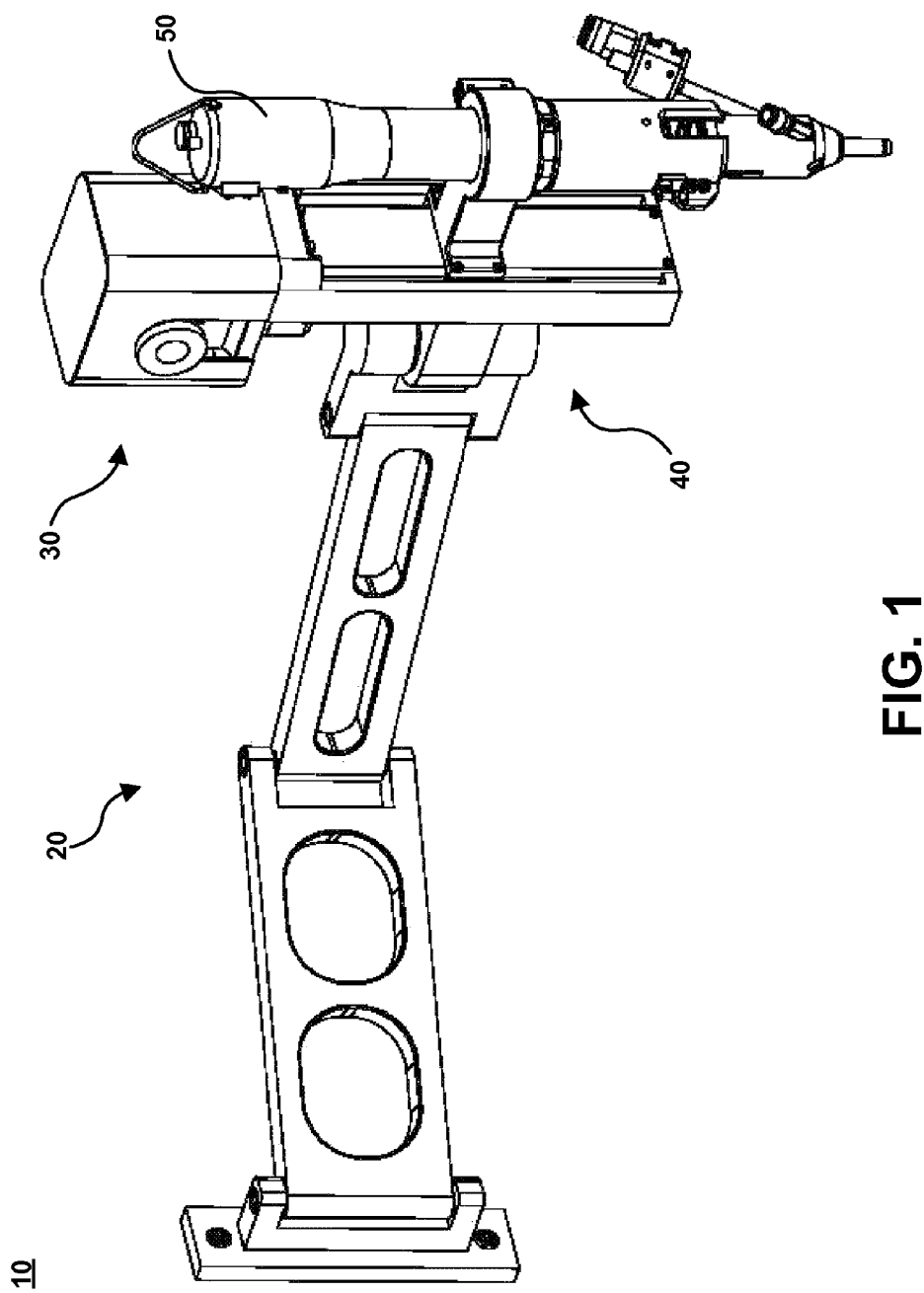
FIG. 1 is a perspective view of a balancer swivel arm assembly according to one aspect of the subject technology.

FIG. 1 is a perspective view of a balancer swivel arm assembly according to one aspect of the subject technology. As depicted in FIG. 1, balancer swivel arm assembly 10 includes articulated arm 20, spring balancer 30 and linear slider 40. Briefly, articulated arm 20 is configured to be pivotably attached to a work station, such as a work station in a hard drive manufacturing assembly line. Linear slider 40 is slidably mounted on a distal end of articulated arm 20 with screwdriver 50 mounted thereon. Spring balancer 30 also is mounted on the distal end of articulated arm 20 and is coupled to linear slider 40 to support linear slider 40 and screwdriver 50 through a linear range of motion. The foregoing components of balancer swivel arm assembly 10 are described in more detail below.

Figure 2:
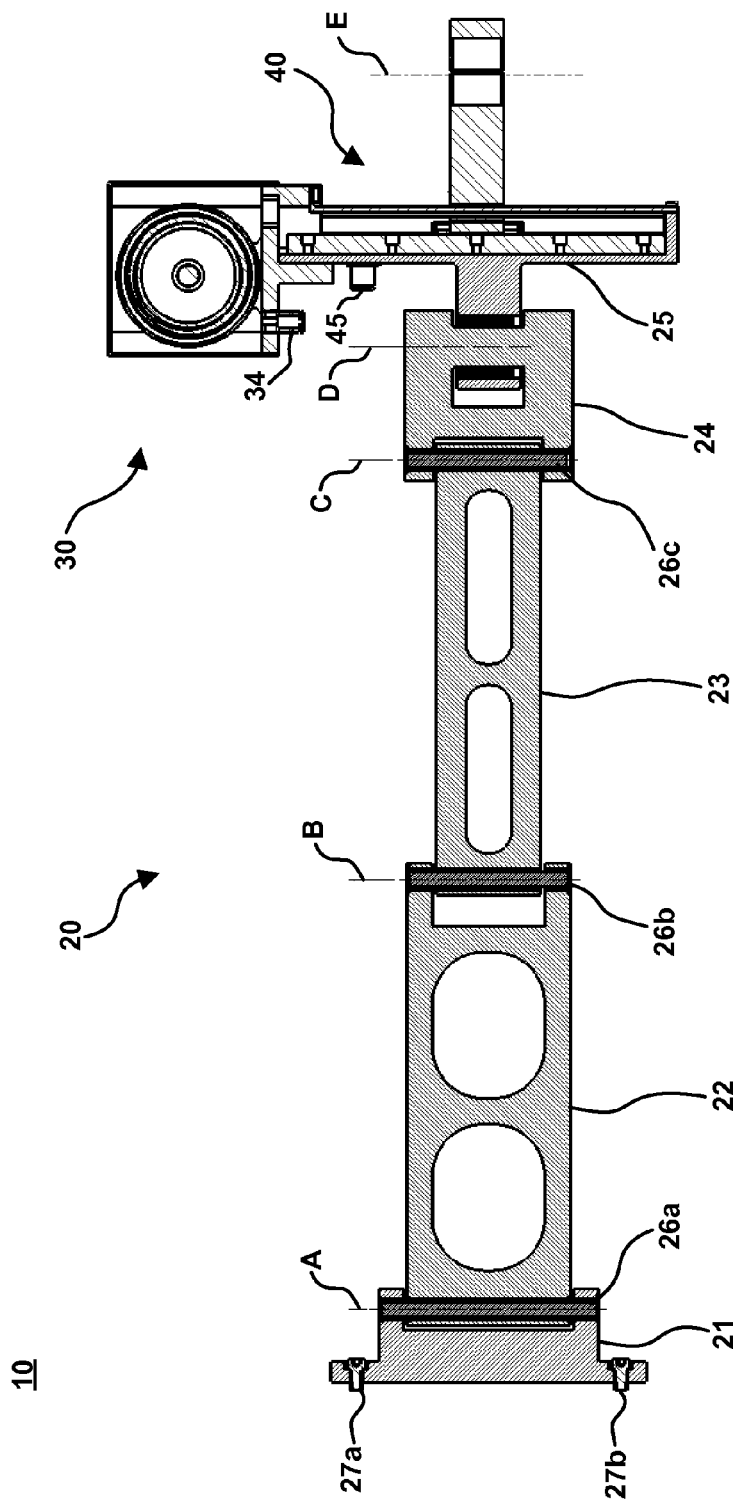
FIG. 2 is a cross-sectional view of a balancer swivel arm assembly according to one aspect of the subject technology.

FIG. 2 is a cross-sectional view of balancer swivel arm assembly 10 without screwdriver 50 mounted to linear slider 40 according to one aspect of the subject technology. As depicted in FIG. 2, articulated arm 20 comprises proximal link 21, first intermediate link 22, second intermediate link 23, distal link 24 and slider bracket 25. Proximal link 21 is configured to be attached to a work station or a wall structure adjacent to a work station. First intermediate link 22 is pivotably coupled to proximal link 21 with first rotary shaft 26a. Second intermediate link 23 is pivotably coupled to first intermediate link 22 with second rotary shaft 26b. Distal link 24 is pivotably coupled to second intermediate link 23 with third rotary shaft 26c. Slider bracket 25 is pivotably coupled to distal link 24.

As indicated above, proximal link 21 is configured to be attached to a work station or a wall structure adjacent to a work station. For example, proximal link 21 may comprise a bracket configured to be attached to the work station or adjacent wall using one or more fasteners, such as screws 27a and 27b depicted in FIG. 2. Screws 27a and 27b may secure proximal link 21 to a support structure of the work station or a mounting surface of an adjacent wall suitable to support balancer swivel arm assembly 10 during use by an operator. Those skilled in the art will recognize that proximal link 21 may be mounted using different types of fasteners and different numbers of fasteners than are represented in FIG. 2. The use of fasteners may allow proximal link 21 to be detachably mounted to the work station or adjacent wall. Alternatively, proximal link 21 may be configured to be more permanently mounted to the work station by welding proximal link 21 to a support structure on the work station.

Figure 3:
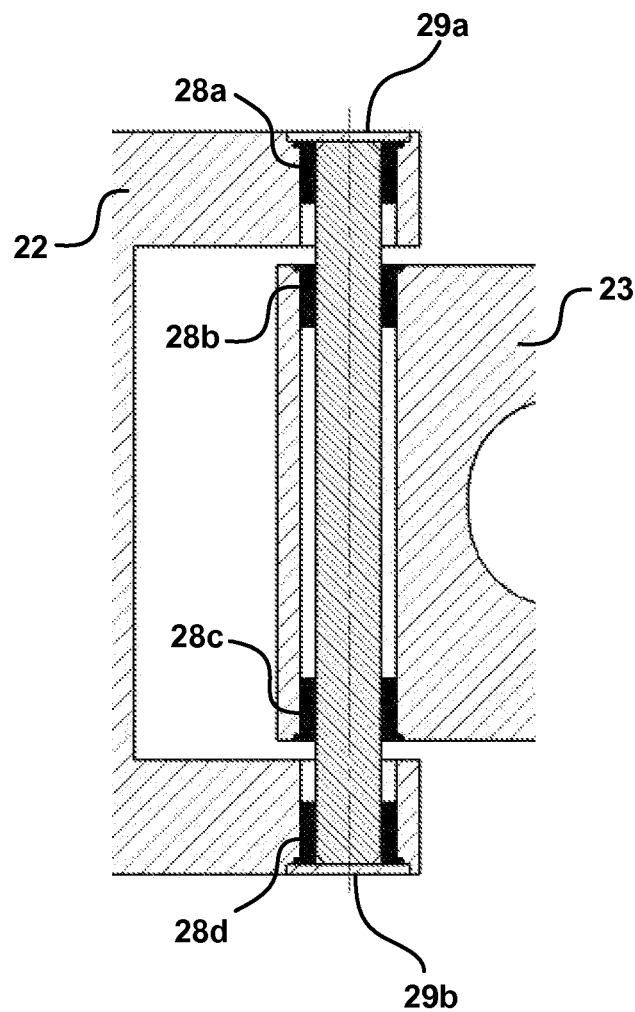
FIG. 3 is a cross-section view depicting the coupling of two links of an articulated arm according to one aspect of the subject technology.

FIG. 3 is a cross-sectional view showing the coupling of first intermediate link 22 to second intermediate link 23 according to one aspect of the subject technology. As depicted in FIG. 3, first intermediate link 22 is pivotably coupled to second intermediate link 23 with second rotary shaft 26b. Second rotary shaft 26b is supported within axial bores of first intermediate link 22 and second intermediate link 23 by radial bearings 28a to 28d. Radial bearings 28a to 28d allow first intermediate link 22 and second intermediate link 23 to pivot with respect to each other around second rotary shaft 26b. The outer openings of the axial bore in first intermediate link 22 are sealed with end caps 29a and 29b.

Radial bearings 28a to 28d are not limited to any particular type of bearing. In cleanroom applications, for example, radial bearings 28a to 28d may be a low dust, greased ball bearing or a non-greased ball bearing. To reduce the possibility of contamination of a cleanroom environment, end caps 29a and 29b may be used to seal the ends of the axial bores in first intermediate link 22, as shown in FIG. 3. In addition, cleanroom-safe plastic bushings or washers (not shown) may be placed between adjacent surfaces of first intermediate link 22 and second intermediate link 23 to prevent rubbing between these two components.

In the example of balancer swivel arm assembly 10 depicted in FIG. 2, the coupling arrangement described above with respect to first intermediate link 22 and second intermediate link 23 is used to pivotably couple distal link 21 to first intermediate link 22 with first rotary shaft 26a and to pivotably couple second intermediate link 23 to distal link 24 with third rotary shaft 26c. While not shown in detail, similar arrangements of radial bearings and end caps are used to support and contain the respective rotary shafts.

As noted above, distal link 24 is pivotably coupled to slider bracket 25. In the example illustrated in FIG. 2, distal link 24 includes an integral rotary shaft that is encased by a coupling arm of slider bracket 25. A radial bearing is arranged between the integral rotary shaft of distal link 24 and an inner surface of the coupling arm of slider bracket 25. The radial bearing allows slider bracket 25 to pivot with respect to distal link 24.

As illustrated in FIG. 2, first rotary shaft 26a is aligned with axis A, second rotary shaft 26b is aligned with axis B, third rotary shaft 26c is aligned with axis C and the integral rotary shaft of distal link 24 is aligned with axis D. According to one aspect of the subject technology, axes A, B, C and D are parallel to one another. With this arrangement, the links of articulated arm 20 may be pivoted with respect to each other to position articulated arm 20 within a plane perpendicular to axes A, B, C and D. For example, if proximal link 21 is mounted perpendicular to the work surface of a work station, articulated arm 20, and in particular the distal end of articulated arm 20, may be positioned within a plane parallel to the work surface of the work station. The four pivotable links (i.e., proximal link 21, first intermediate link 22, second intermediate link 23 and distal link 24) of articulated arm 20 provide a wide range of motion within the plane while allowing articulated arm 20 to function within a relatively small work area. Alternative configurations of articulated arm 20 may include only a single intermediate link or may include more than two intermediate links without departing from the scope of the subject technology. The number of intermediate links may vary depending on the arrangement and dimensions of the work station in which articulated arm 20 is to be operated as well as the size and weight of the tool to be supported on the distal end of articulated arm 20.

Articulated arm 20 allows an operator to position balancer swivel arm assembly 10 within a plane parallel to the work surface of a work station. Spring balancer 30 and linear slider 40 allow the operator to position a power tool mounted on the distal end of articulated arm 20 through a linear range of motion along axis E depicted in FIG. 2. Spring balancer 30 and linear slider 40 are illustrated in more detail in FIG. 4.

Figure 4:
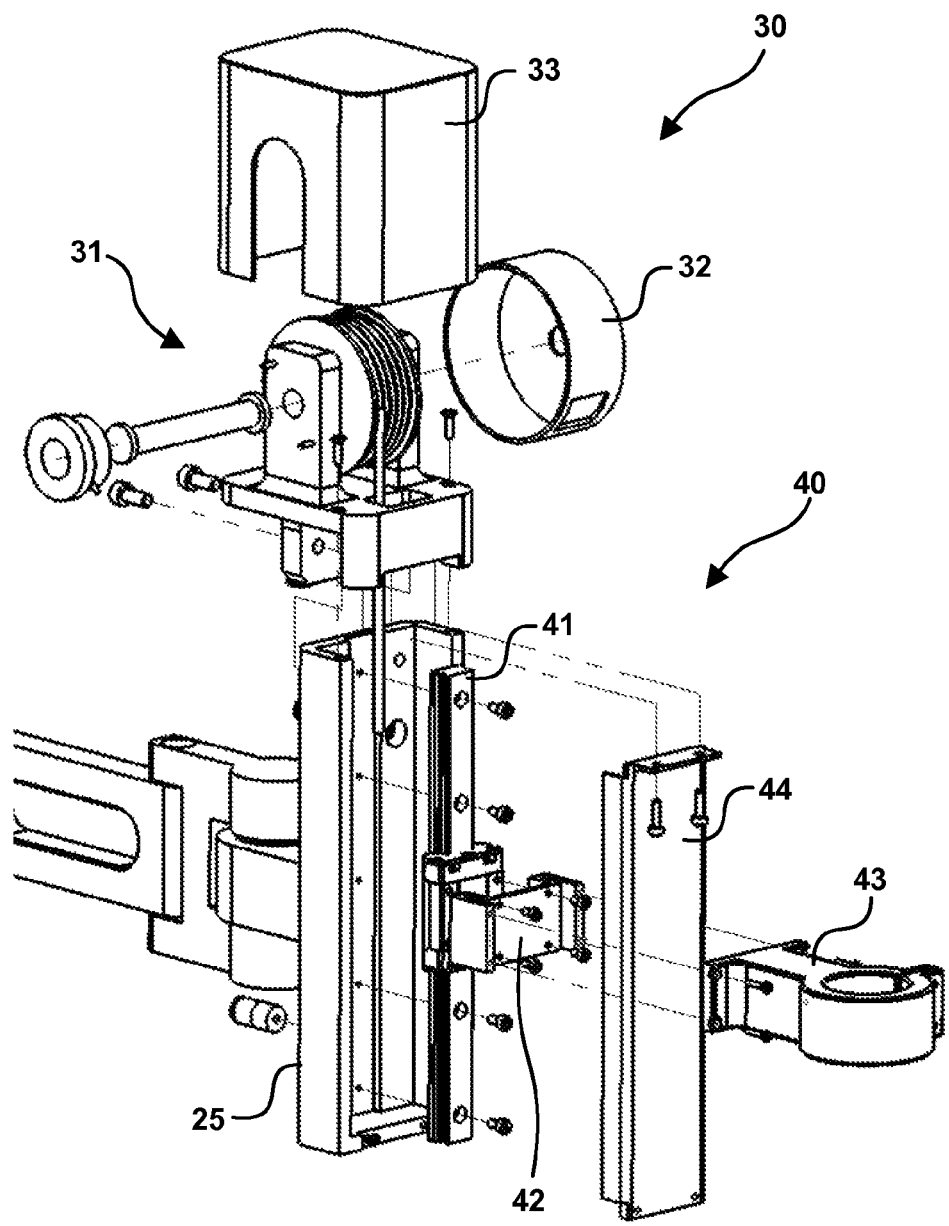
FIG. 4 is an exploded view of a spring balancer and linear slider arranged on an articulated arm according to one aspect of the subject technology.

FIG. 4 is an exploded view of components of spring balancer 30 and linear slider 40. As depicted in FIG. 4, spring balancer 30 includes rotating cable assembly 31, inner cover 32 and outer cover 33. Linear slider 40 includes rail 41, carriage 42 and tool mount 43.

With respect to spring balancer 30, rotating cable assembly 31 is mounted to slider bracket 25 and comprises a spool having a cable wound thereon. The spool is coupled to a torsion spring and arranged to spin around an axel. As the cable is unwound from the spool, the tension on the torsion spring increases to provide a restorative force to rewind the cable onto the spool. The spool with the cable wound thereon is partially enclosed by inner cover 32. Outer cover 33 partially encloses rotating cable assembly 31 and inner cover 32.

Inner cover 32 and outer cover 33 are arranged around rotating cable assembly 31 to reduce the possibility of contaminating a cleanroom environment as rotating cable assembly 31 unwinds and rewinds during operation of balancer swivel arm assembly 10 by an operator. Specifically, inner cover 32 and outer cover 33 are intended to contain pollutants such as lubricant, dust and particles generated by components rubbing together or colliding within a cavity partially defined a base portion of rotating cable assembly 31 and outer cover 33. To further reduce the possibility of contamination, a vacuum may be applied to the cavity through vacuum port 34 depicted in FIG. 2 to evacuate any pollutants that may be generated therein.

Rail 41 is mounted in a cavity of slider bracket 25. Carriage 42 is attached to rail 41 and configured to slide along rail 41 through a linear range motion parallel to axes A, B, C and D. The subject technology is not limited to any particular type of rail and carriage. For cleanroom applications, a rail and carriage using enclosed ball bearings lubricated with cleanroom grease may be used. In addition, cover 44 may be attached to slider bracket 25 to partially enclose the cavity containing rail 41 and carriage 42. Similar to the arrangement of spring balancer 30, a vacuum may be applied to the cavity in slider bracket 25 containing rail 41 and carriage 42 through vacuum port 45 depicted in FIG. 2. In this manner, pollutants such lubricant, dust and particles created by components rubbing together or colliding may be evacuated from the cavity rather than being expelled into a cleanroom environment. In addition, cleanroom safe shock absorbing materials may be placed at the ends of rail 41 to absorb any impact and minimize particle generation as carriage 42 reaches the limits of the linear range of motion along rail 41.

Tool mount 43 is attached to carriage 42 and is configured to hold a tool, such as screwdriver 50 depicted in FIG. 1. Tool mount 43 may use a conventional clamping mechanism to hold the tool. Alternatively, tool mount 43 may use a proprietary mechanism specifically designed to hold a particular tool or brand of tool. Tool mount 43 may be arranged to hold the tool in a particular alignment as tool mount 43 and carriage 42 move through the linear range of motion along rail 41. For example, tool mount 43 may hold the tool, such as screwdriver 50, in alignment with axis E depicted in FIG. 3, which is parallel to axes A, B, C and D. In this manner, the tool can be maintained in an alignment perpendicular with the work surface of a work station both through the linear range of motion along rail 40 as well as the planar range of motion of articulated arm 20. In addition, tool mount 43 also may prevent the rotation of a tool attached to tool mount 43 in order to absorb torque generated by the tool, such as a screwdriver, rather than allowing that torque to be transmitted to the hands and wrists of an operator.

According to one aspect of the subject technology, the cable of rotating cable assembly 31 is attached to carriage 42 to support carriage 42, tool mount 43 and any tool mounted thereon through linear range of motion along axis E. The torsion spring in rotating cable assembly 31 may be adjustable to allow different tools having different weights to be supported. The restorative force of the torsion spring in rotating cable assembly 31 allows a tool mounted to tool mount 43 to be positioned along axis E with minimal effort by an operator. Similarly, operation of articulated arm 20 allows the tool mounted to tool mount 43 to be positioned within a plane parallel to the work surface of a work station with minimal effort.

The subject technology is not limited to supporting any particular type of tool. As noted above, a screwdriver may be mounted in tool mount 43. The screwdriver may be electrically driven or pneumatic. Other types of power tools also may be mounted to tool mount 43 to facilitate the supported positioning and operation of the tool by an operator using balancer swivel arm assembly 10.

The various components of balancer swivel arm assembly 10 are not limited to any particular type of materials. For example, electro nickel plated aluminum and/or electro polished stainless steel may be used to form the links of articulated arm 20 as well as components of spring balancer 30 and linear slider 40. Those skilled in the art will recognize that relative heavy, rigid materials may be used to form articulated arm 20, which must support spring balancer 30, linear slider 40 and a mounted tool through a range of extended positions. Similarly, those skilled in the art will recognize that relatively lighter materials may be used to form the components of spring balancer 30 and linear slider 40 in order to minimize the weight on the distal end of articulated arm 20.

As discussed above, the links of articulated arm 20 are coupled with radial bearing joints which provide rigid support for maintaining articulated arm 20 within a plane parallel to the work surface of a work station. Furthermore, positioning linear slider 40 at the distal end of articulated arm 20 as close as possible to the tool minimizes any tilting of the tool during operation due to a cantilever moment applied to linear slider 40. The multiple links described above allow balancer swivel arm assembly 20 to be operated within a relatively confined work station. Accordingly, an operator may use balancer swivel arm assembly to support a tool during a large number of repetitive operations, such as driving screws, while minimizing fatigue to the operator by supporting the tool in a position perpendicular to the work surface of the work station within a wide range of motion in a plane parallel to the work surface.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for supporting a tool in a work station, comprising:
    attaching a proximal end of an articulated arm to a work station;
    mounting a tool to a linear slider that is attached to a distal end of the articulated arm, the linear slider comprising:
        a rail aliened with a first axis;
        a carriage that is slidably attached, to the rail and that is removably attached to the tool; and
        a first cover configured to enclose at least a portion of the rail in a first cavity defined by the first cover and a portion of the linear slider;
    coupling a balancer to the distal end of the articulated arm and to the linear slider, the balancer comprising a rotating cable assembly that comprises a spool coupled to a torsion spring and a cable wound on the spool, a first end of the cable being attached, within the first cavity, to the carriage;
    supporting the tool through a linear range of motion on the rail along the first axis;
    unwinding the cable from the spool such that a portion thereof enters the first cavity and providing a restorative force on the tool by correspondingly increasing a tension on the torsion spring as the tool is moved in a first direction on the rail along the first axis through at least part of the linear range of motion; and
    rewinding the cable onto the spool, such that the portion thereof leaves the first cavity, using the restorative force as the tool is moved on the rail in a second direction along the first axis through at least part of the linear range of motion.

2. The method for supporting a tool according to claim 1, further comprising:
    applying a vacuum to the first cavity.

3. The method for supporting a tool according to claim 1, wherein the first axis is perpendicular to a work surface of the work station.

4. The method for supporting a tool according to claim 1, wherein the articulated arm comprises a plurality of links, each link pivotable about as respective axis parallel to the first axis.

5. The method for supporting a tool according to claim 1, further comprising positioning the tool and the linear slider along the first axis.

6. The method for supporting a tool according to claim 1, wherein at least a portion of the balancer is disposed within a second cavity defined by a second cover, the method further comprising applying a vacuum to the second cavity.

7. The method for supporting a tool according to claim 6, wherein the cable spans the first cavity and at least a portion of the second cavity and wherein winding and rewinding causes the portion of the cable to be sequentially located within one and then the other of the first and second cavities.

8. The method for supporting a tool according to claim 6, wherein a second end of the cable is attached to the spool within the second cavity, and wherein applying the vacuum to the second cavity comprises applying the vacuum to the spool, to the second end of the cable and to any cable wound onto the spool during winding and unwinding.

* * * * *